July 27, 1971
G. S. SPERTI
3,595,623
APPARATUS FOR EXTRACTING FLAVORING
ELEMENTS FROM VEGETABLE MATTER
Filed May 9, 1967
3 Sheets-Sheet 1
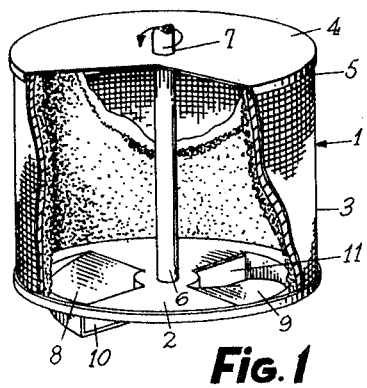
Fig. 1
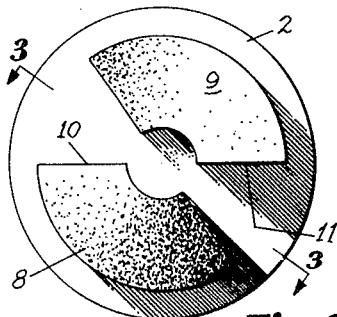
Fig. 2
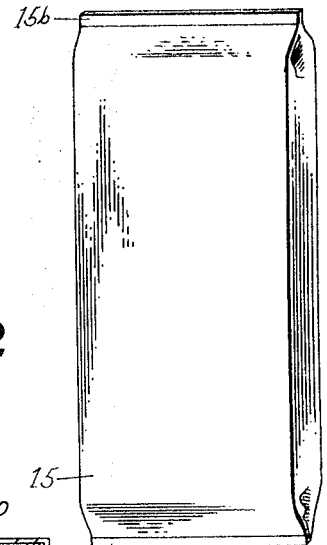
Fig. 4
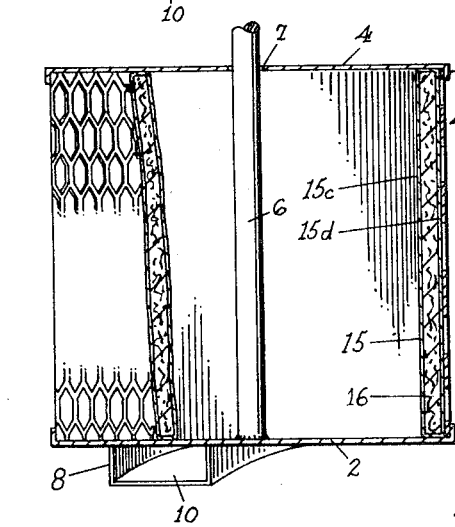
Fig. 3
Fig. 5
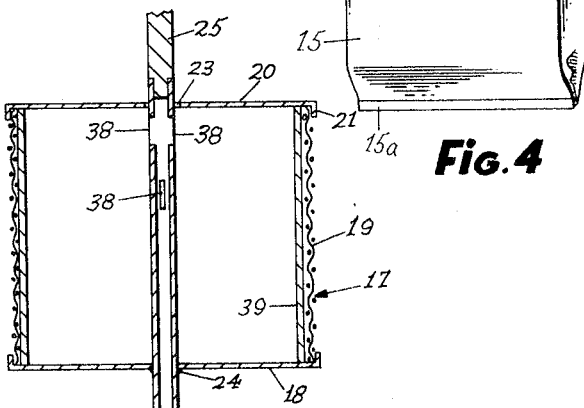
Fig. 6
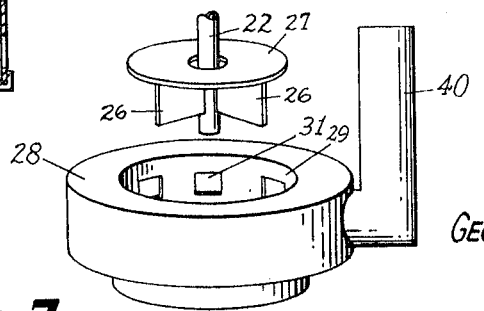
Fig. 7
INVENTOR
GEORGE S. SPERTI,
BY MELVILLE, STRASSER, FOSTER & HOFFMAN
ATTORNEYS

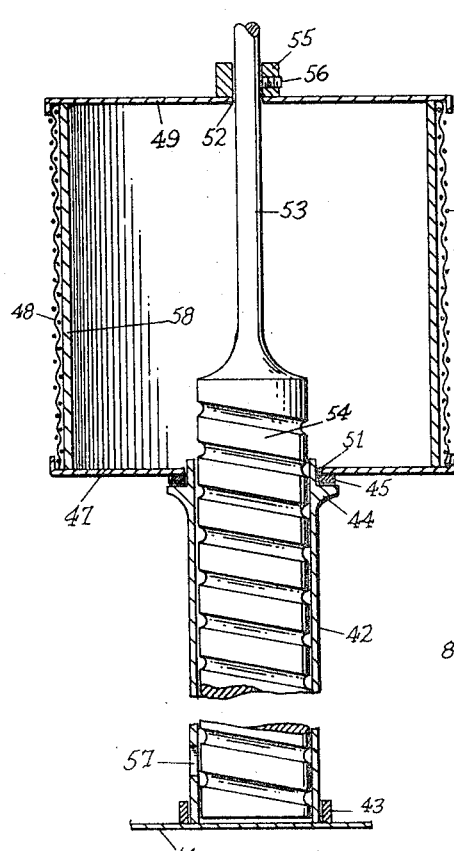
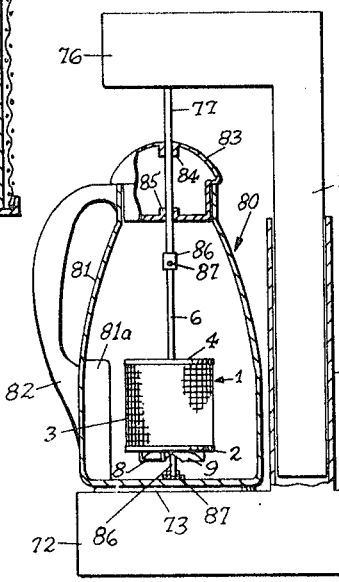
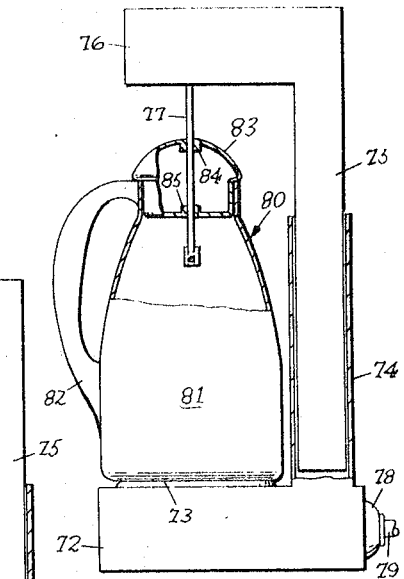
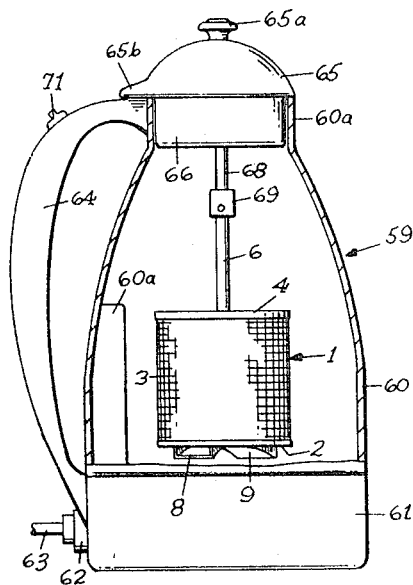
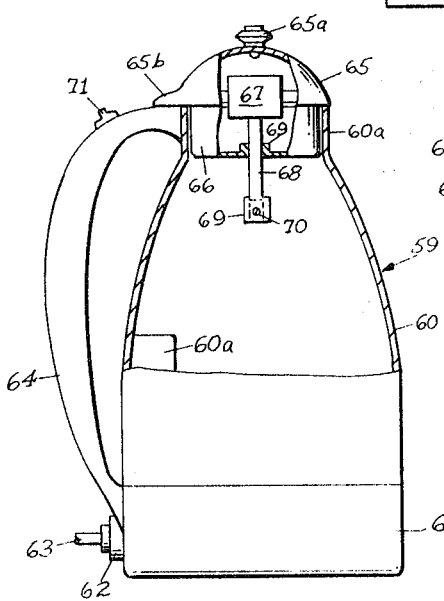

July 27, 1971 G. S. SPERTI 3,595,623
APPARATUS FOR EXTRACTING FLAVORING
ELEMENTS FROM VEGETABLE MATTER
Filed May 9, 1967 3 Sheets-Sheet 3

INVENTOR/S
GEORGE S. SPERTI,

BY Melville, Strasser, Foster and Hoffman
ATTORNEYS

United States Patent Office 3,595,623
Patented July 27, 1971

3,595,623
APPARATUS FOR EXTRACTING FLAVORING ELEMENTS FROM VEGETABLE MATTER
George S. Sperti, Burlington, Ky., assignor to Institutum Divi Thomae Foundation, Cincinnati, Ohio
Filed May 9, 1967, Ser. No. 637,277
Int. Cl. B01d *11/02;* A23f *1/08*
U.S. Cl. 23—269                                5 Claims

ABSTRACT OF THE DISCLOSURE

The invention comprises a means for the extraction of flavoring elements from vegetable matter wherein a container for the vegetable matter is located in a surrounding vessel containing the desired amount of extracting liquid. The container has foraminous side walls and filtering means associated therewith. Means are provided for rotating the container within the vessel. Additional means are provided for drawing the extracting fluid from the vessel into the container where, by centrifugal force, the extracting fluid is caused to pass through the vegetable matter, the filtering means and the forminous side walls of the container back into the vessel. Continuous circulation of the extracting liquid between the vessel and the container, through the vegetable matter, produces an excellent yield of flavoring elements from a minimum amount of vegetable matter in a minimum amount of time.

BACKGROUND OF THE INVENTION

(1) Field of invention

The invention relates to a means for extracting flavoring elements from vegetable matter, and more particularly to a method and means for such extraction wherein the extracting liquid is continuously circulated through the vegetable matter so that a greatly increased yield is obtained from a given amount of vegetable matter in a markedly reduced amount of time.

The means of the present invention may be used in extracting flavoring elements from any suitable type of vegetable matter such as coffee, tea, herbs and the like. While not intended to be so limited, for purposes of an exemplary showing the method and means of the present invention will be described in terms of the making of coffee.

(2) Description of the prior art

There are a number of methods and a number of means by which coffee may be made from ground coffee beans. For example, one type of coffee maker comprises a first vessel and a second vessel located thereabove. The second vessel is affixed to the first in an airtight fashion, and has a downwardly depending tube which extends substantially to the bottom of the first vessel. The first vessel is filled with water and the second vessel is filled with ground coffee. Heat is applied to the first vessel and as the water is brought to a boil the resultant pressure in the first vessel forces the water therein upwardly through the tube into the second vessel. The assembly is then removed from the heat source and as is cools a vacuum is formed in the first vessel causing the water in the second vessel to pass through the ground coffee in to the first. Means are provided to prevent the coffee grounds in the second vessel from passing downwardly through the tube.

Another type of coffee maker comprises a coffeepot which may be heated by external means or may be provided with its own heating element. The coffeepot has a vertically oriented hollow tube supported on the bottom of the pot. A container for ground coffee beans is provided, and has a foraminous bottom and a removable foraminous top. The container is supported on the tube which extends upwardly through it and beyond the foraminous top. The bottom of the hollow tube may be provided with a one way valve and as water is brought to boil in the pot it is forced upwardly through the tube and discharged from the upper end of the tube. The water so discharged passes through the foraminous top of the container, the ground coffee and the foraminous bottom of the container returning to the main body of water in the pot. In this way, over a period of time, substantially all of the water in the pot is caused to pass through the ground coffee.

The third most common method of making coffee is the so-called "drip method" whereby preheated water is poured one or more times through a container of ground coffee.

All of the methods described above are time consuming and the yield for a given amount of ground coffee used is low. Where a filter is used in connection with any of the above mentioned methods, the time required is increased.

In order to increase the yield and to reduce the time required to make coffee, a number of so-called "instant coffee" products have been marketed. These products comprise powdered coffee extracts. The most usual method of making coffee utilizing the instant products includes the steps of bringing water to a boil or nearly to a boil, and adding thereto a measured amount of the instant product. The water containing the product is then removed from the heat source and allowed to steep for several minutes.

The present invention provides a means for making coffee from ordinary ground coffee beans in a period of time substantially equivalent to the amount of time required when using the above mentioned instant products. In accordance with the present invention one and one-half to two times the normal yield may be achieved for a given amount of ground coffee, so that the amount of ground coffee used may be substantially two thirds to one-half that used in the above described methods. In the practice of the present invention a filter may be employed having excellent filtering characteristics to produce a clear product without materially increasing the time required. Furthermore, the means of the present invention obviate the necessity of boiling the final product with consequent flavor impairment.

SUMMARY OF THE INVENTION

The invention contemplates a means for extracting flavoring elements from vegetable matter in which a container for vegetable matter is located within a vessel filled with the desired amount of extracting liquid. Rotation of the container within the vessel causes the extracting liquid from the vessel to continuously circulate through the vegetable matter in the container.

In each of the embodiments the container for the vegetable matter has foraminous side walls which may be covered wtih a filter material, an access opening, means for closing or partially closing the access opening, means for preventing escape of the vegetable matter into the surrounding vessel, and means for forcing the extracting liquid in the vessel to enter the container. Rotation of the container causes the extracting liquid to pass through the vegetable matter, the filter and the foraminous side walls of the container back into the vessel by centrifugal force. The vegetable matter may be placed directly in the container or may be packaged in an elongated packet of filter material which, in turn, may be placed in the container along the foraminous side walls.

In one embodiment the container is mounted on a shaft and the bottom of the container is provided with scoop means for introducing the extracting liquid from the vessel into the container.

In a second embodiment the container is mounted on a hollow shaft means passing through the container and extending therebelow. The bottom of the shaft means is provided with impeller blades located in a pump housing on the bottom of the surrounding vessel. Rotation of the container and shaft means assembly causes the impeller blades to force the extracting liquid in the vessel into the pump housing and thence upwardly within the hollow shaft means. Perforations in that part of the shaft means passing through the container permit liquid within the shaft means to enter the container.

In a third embodiment, the container is affixed to a shaft which passes therethrough and extends through and below a perforation in the container bottom. That portion of the shaft extending through and below the container bottom is configured as a pump screw and is adapted to cooperate with a pump housing affixed to the bottom of the surrounding vessel. The lower portion of the pump housing has one or more inlet openings communicating with the vessel, and the upper portion of the housing has an outlet opening communicating with the perforation in the container bottom. Rotation of the container and shaft causes extracting liquid from the vessel to be drawn into the pump housing through the inlet opening. The liquid is expelled from the pump housing outlet opening into the container.

In yet another embodiment the container has a shaft extending below it and into a pump housing at the bottom of the surrounding vessel. The bottom of the shaft is provided with impeller blades and the pump housing has a pipe communicating with an opening in the container top. Rotation of the container and shaft causes the impeller blades to force extracting liquid up through the pipe and into the container through the opening in the container top.

In all of the embodiments motor means are provided which may have a quick release connection to the shaft of the container-shaft assembly. The motor means may be located in the bottom or in a top or cap for the surrounding vessel. The motor means may also be located in a separate unit with a motor shaft passing through the vessel top or cap through a sealed bearing means in the vessel bottom. Heating means for the extracting liquid may be located in a part of the vessel, or the extracting liquid may be heated by an external source. Baffle means may also be located within the vessel to prevent undue swirling of the extracting liquid therein during rotation of the container. Finally, the heating means for the extracting liquid and the motor means for rotating the container may be thermostatically and timer controlled.

BRIEF DESCRIPTION OF THE DRAWINGS

FIG. 1 is a fragmentary perspective view of a vegetable matter container of the present invention.

FIG. 2 is a bottom view of the container of FIG. 1.

FIG. 3 is a cross sectional view taken along the section line 3—3 of FIG. 2 and showing the use of a filter means and a foraminous retaining means.

FIG. 4 is a perspective view of a package for vegetable matter such as ground coffee and the like, the package being made of filter material.

FIG. 5 is a cross sectional view similar to FIG. 3 and illustrating the use of the package of FIG. 4.

FIG. 6 is a cross sectional elevational view of another embodiment of the apparatus of the present invention.

FIG. 7 is a fragmentary perspective view of the embodiment of FIG. 6.

FIG. 8 is a cross sectional elevational view of yet another embodiment of the apparatus of the present invention.

FIG. 9 is an elevational view with a part in cross section of a coffeepot for use with the apparatus of FIGS. 1, 6 or 8.

FIG. 10 is an elevational view with a part in cross section illustrating the apparatus of FIG. 1 in combination with the coffeepot of FIG. 9.

FIG. 11 is an elevational view of a coffeepot of the present invention and a stand therefor, a portion of the pot being in cross section to show the rotating shaft of the stand extending therein.

FIG. 12 is an elevational view, partly in cross section, similar to FIG. 11 and showing the structure of FIG. 11 in combination with the device of FIG. 1.

FIG. 13 is a simplified diagrammatic representation of typical electrical circuitry for the device of the present invention.

DESCRIPTION OF THE PREFERRED EMBODIMENTS

Figure 14:
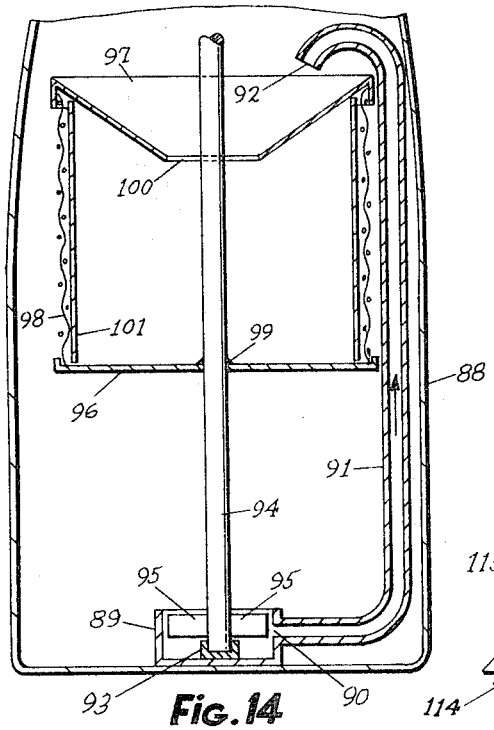
FIG. 14 is a fragmentary cross sectional elevational view of yet another embodiment of the present invention.

One embodiment of the coffee making device of the present invention is illustrated in perspective in FIG. 1. The device comprises a cylindrical container generally indicated at 1. The container comprises a circular bottom 2, a cylindrical side wall 3, and a circular top element 4. The cylindrical side wall 3 is permanently affixed by any suitable means to the bottom 2 and is made of foraminous material. As indicated in FIG. 1, the side wall 3 may be made of wire mesh or screen, or it may be made of expanded metal as indicated in FIG. 5. The circular top 4 is removably engaged with the container side wall 3. For purposes of an exemplary showing, the top 4 is illustrated as having a downwardly depending peripheral flange 5 adapted to frictionally engage the top edge of the cylindrical side wall 3. A vertically oriented shaft 6 is located within the container. The axes of the shaft 6 lies along the axes of the cylindrical side 3. The lower end of the shaft 6 is premanently affixed to the center of the bottom 2 by any suitable means such as soldering, welding or the like. The upper end of the shaft extends through a perforation 7 in the container top 4. The upper end of the shaft may simply terminate in a blunt end, or may be provided with a quick coupling means as will be described more fully hereinafter.

As indicated in FIGS. 1 and 2, the bottom 2 of the container is provided with a pair of arcuate downwardly sloping scoops 8 and 9. The forward ends of the scoops 8 and 9 are open as indicated at 10 and 11 respectively.

Reference is made to FIG. 3 wherein like parts have been given like index numerials. A filter, indicated at 12, may be located within the container adjacent the cylindrical wall 3. The filter 12 may be made of paper or the like and may be disposable. On the other hand, the filter 12 may be made of cloth or synthetic material and may be used a plurality of times. Where the cylindrical side wall 3 is made of suitably fine mesh or screen, a filter may or may not be used as desired.

The container 1 may also be provided with a conical retaining means 13. The retaining means 13 may be made of wire mesh or the like, and should have a mesh size such that ground coffee will not pass therethrough. The retaining means may be removably affixed within the container, or it may be permanently affixed by soldering or the like to the bottom 2 as at 13a and to shaft 6 as at 13b. It will be noted that the base portion or bottom edge of the conical retainer is of such diameter that it contacts the bottom of the container at the point 13a beyond the scoops 8 and 9 so that the scoops are completely enclosed by it.

The use of the device of FIGS. 1, 2 and 3 may be described as follows. A suitable vessel (which may be an ordinary coffeepot) is filled with the desired amount of hot or cold water. Heat is applied to the vessel to bring the water to a boil or nearly to a boil if cold water is used to begin with. The container 1 is filled with a desired amount of ground coffee, and the container top 4 is engaged with the upper edge of the cylindrical wall 3. It will be noted that none of the ground coffee can escape through the scoops 8 and 9 by virtue of the conical retaining means 13. When the water in the pot or vessel has reached the desired temperature, the pot is removed from the heat source. The upper end of the shaft 6 is affixed to means for imparting rotation to it. The means for imparting rotation to the shaft 6 and thus to the container 1 will be more fully described hereinafter. The container 1 is then partially or totally submerged in the hot water and caused to rotate. The centrifugal force created by the rotation of the container 1 will cause the coffee grounds to form a layer against the filter 12 as indicated at 14 in FIG. 3. Hot water will be forced into the container by the action of the scoops 8 and 9. Centrifugal force will cause the water to pass through the foraminous retainer 13, the layer of ground coffee 14, the filter 12 and the foraminous cylindrical wall 3.

The strength of the coffee thus produced will depend upon the amount of ground coffee placed in the container 1 and the amount of time the container is caused to rotate in the hot water. It has been found that for any given amount of ground coffee and any given amount of water, rotation of the container 1 in the hot water for two minutes or less will produce a highly desirable product with good flavor characteristics. While the invention is not intended to be so limited, a speed of rotation of the container of between about 800 and about 900 r.p.m. has been found to produce excellent results. Higher speeds up to 2300 and 3550 r.p.m. have been used with excellent results. Speeds lower than 800 r.p.m. may also be used, depending upon the design and diameter of the container.

It has further been found that the making of coffee by the above described method and apparatus enables the use of only two thirds to one-half as much ground coffee for a given amount of end product than is required by conventional coffee making processes. Furthermore, a filter with greater filtering characteristics can be used in the container 1, since the water is forced through the filter by centrifugal action. The use of such filters does not materially affect the time required for the coffee making process. The filter may be made of paper, cloth, synthetic material or the like.

For example, in a device of the present invention pulverized coffee in a proportion of 29 mg. per cc. of water was brewed for five minutes. The resulting brew gave a reading on a light transmission meter of 76, equivalent to 8 mg. per cc. in the brew, or a yield of 8/29 or 27.5%. In a regular percolator 54 mg. of percolator ground coffee per cc. of water were brewed for twenty minutes and gave a reading on the light transmission meter of 80, equivalent to 9.6 mg. per cc. in the brew, or a yield of 9.6/54 or 18%.

It will be understood by one skilled in the art that the size of the container 3 will depend upon the capacity of the water containing pot or vessel. The device of FIGS. 1, 2 and 3, as well as the embodiments to be described hereinafter, may be equally well applied to vessels or pots for household use or large coffee urns for use in commercial establishments.

It has further been determined that the device of FIGS. 1, 2 and 3 works equally well when the container is submerged only to a depth sufficient for the scoops 8 and 9 to pick up water, or when the container 1 is completely submerged. Thus, when the device is used in a pot or vessel for household use, it is preferable that the shaft 6 be of such length as to cause the scoops 8 and 9 to be positioned near the bottom of the pot. Therefore, when only a single cup is desired, a very small amount of water may be used in the pot or vessel. On the other hand, when a full pot is desired, the vessel may be filled to the appropriate level even though the container 1 be fully submerged.

FIG. 4 illustrates an elongated bag or packet 15 adapted to contain ground coffee. For filling purposes, the ends of the packet may be opened, and later sealed by any suitable means as at 15a and 15b. The packet is made of filter material which may be either a paper, a cloth or synthetic material. The packet is adapted to contain a measured amount of ground coffee and is intended to be disposable.

While the dimensions of the packet 15 do not constitute a limitation on the present invention, it is preferred that the packet not have a width greater than the height of the cylindrical foraminous wall 3 of the container. While it is not necessary, the packet should also have a length substantially equal to the circumference of the foraminous wall 3.

The structure shown in FIG. 5 is similar to that illustrated in FIGS. 1, 2 and 3, and like parts have been given like index numerals. The container 1 is shown with a packet 15 of the type illustrated in FIG. 4 placed along the inside surface of the foraminous wall 3. The packet is shown in cross section, having sides 15c and 15d, with ground coffee 16 located therebetween. Since the packet itself is made of filter material, the sides 15c and 15d will serve the same purpose as the filter 12 in FIG. 3. Similarly, the packet will contain the ground coffee and obviates the necessity for a retaining means of the type shown at 13 in FIG. 3. The method of making coffee with the embodiment of FIG. 5 is similar to that described with respect to the embodiment of FIGS. 1, 2 and 3.

After the coffee making process has been performed, the coffee grounds must be removed from the embodiments of FIGS. 1, 2 and 3, and the container washed. The filter 12 must also be washed or replaced. With the embodiment of FIG. 5, the coffee grounds will be retained within the packet 15, and it is only necesary to remove the packet 15 and wash the container.

Another embodiment of the present invention is illustrated in FIGS. 6 and 7. In this embodiment a container generally indicated at 17 is provided which is similar to the container 1 in FIGS. 1–5. The container 17 comprises a circular bottom 18 and a foraminous cylindrical side wall 19. The lower edge of the side wall is permanently affixed to the bottom 18 and the side wall itself may be made of expanded metal or (as illustrated for purposes of an exemplary showing) may be made of wire mesh material. The container is provided with a removable top 20 having a downwardly depending peripheral flange 21 adapted to frictionally engage the upper edge of the foraminous side wall 19. The container is supported on a hollow shaft 22 which passes through the bottom 18 and a perforation 23 in the top 20. At the point where the shaft 22 passes through the bottom 18, the shaft is permanently affixed to the bottom as by welding or the like (indicated at 24). The uppermost end of the hollow shaft 22 is plugged by a coaxial shaft element 25, which may be permanently affixed to the shaft 22.

The lowermost end of the hollow shaft 22 is provided with a plurality of radially extending impeller blades 26 with an annular support means 27 affixed thereto. A cylindrical pump housing is indicated at 28. The pump housing has a circular, centrally located depression generally indicated at 29. The side walls 30 of the depression have a plurality of openings 31. The circular bottom 32 of the opening is provided with a centrally located perforation 33 and bearing means (diagrammatically illustrated at 33a).

The circular depressed portion 29 of the pump housing is adapted to receive the blades 26 while the perforation 33 and bearing means 33a are adapted to receive the end of the hollow shaft 22.

The pump housing 28 may be permanently or removably affixed to the bottom 34 of a coffeepot or other suitable vessel. For purposes of an exemplary showing, the vessel bottom 34 is illustrated as having an upstanding annular rim 35 adapted to frictionally engage the bottom of the pump housing.

Briefly, the structure of FIG. 6 may be used as follows. A vessel having a bottom indicated at 34 and including the pump housing held in place as described, is provided with the desired quantity of water. The water may be heated in the vessel, or introduced into the vessel in heated condition. When the water is brought to boiling or substantially to boiling, the heat source is removed. The container 17 having been filled with a desired amount of ground coffee is affixed to means for imparting rotation, said means engaging the upper shaft portion 25. This assembly is lowered into the water containing vessel and the lower end of the shaft 22 is inserted in the perforation 33 and bearing means 33a of the pump housing. The assembly is then caused to rotate. The impeller blades 26 draw the hot water into the depression 29 through the annular space 36 between the brace 27 and the wall portion 30 of the pump housing, and through the space 37 between the brace 27 and the hollow shaft 22. The water in the depressed portion 29 is forced through the openings 31 into the pump housing. From the pump housing the water is forced upwardly in the hollow shaft 22 and caused to enter the chamber 17 through a plurality of slots 38 in the shaft 22. Centrifugal force will cause the ground coffee to assume a position similar to that shown at 14 in FIG. 3. The container 17 may also be provided with filter means shown at 39. The water issuing from the slots 38 will, by centrifugal force, be caused to pass through the layer of ground coffee (not shown), the filter 39 and the foraminous wall 19 into the main body of the pot or vessel.

A vertically oriented spoiler 40 may be permanently affixed to the exterior of the pump housing 28, to prevent undue swirling of the body of water in the pot or vessel. It will be understood by one skilled in the art that the water intake openings 31 are located relatively near the bottom 34 of the pot or vessel, so that substantially any desired amount of water may be used. Coffee made by means of the structure of FIGS. 6 and 7 will have the same characteristics as that made by means of the structures described in FIGS. 1–5. Again, clear coffee with good flavor characteristics can be made in two minutes or less utilizing substantially two thirds to one-half as much coffee as would be required in the standard coffee making procedures.

FIG. 8 illustrates yet another embodiment of the present invention. The bottom of a suitable pot or vessel is indicated at 41. Removably supported on the bottom is a cylindrical housing 42. For purposes of an exemplary showing, the bottom 41 is illustrated as having an upstanding annular rim 43 adapted to frictionally engage the lower end of the housing 42. Near its upper end the housing is provided with a peripheral flange 44 adapted to support an annular bearing means 45. The bearing means 45 may be made of any suitable substance such as plastic or the like.

A container generally indicated at 46 is substantially the same as the container 17 in FIG. 6 and comprises a bottom 47, a cylindrical foraminous side wall 48 and a removable top 49. The foraminous side wall 48 may again be made of any suitable material such as wire mesh, expanded metal or the like, and is permanently affixed at its lower edge to the bottom 47. The top 49 has a peripheral downwardly depending flange 50 adapted to frictionally engage the upper edge of the side wall 48.

The container bottom 47 is provided with a centrally located perforation 51 through which the upper end of the housing 42 extends. That portion of the bottom adjacent the perforation 51 rests on the bearing means 45 so that the container 46 is rotatable with respect to the housing 42. The exterior diameter of the housing 42 and the diameter of the perforation 51 in the container bottom are such that while the container is freely rotatable, coffee grounds located within the container will not pass through the perforation 51.

The top 49 is provided with a central perforation 52. The central perforation 52 is adapted to receive a shaft 53 of a pump screw 54. Means are provided in association with the top 49 whereby the top may removably but non-rotatively engage the shaft 53. For purposes of an exemplary showing the top 49 is illustrated as provided with a collar 55 affixed to it, and provided with a set screw 56 adapted to engage the shaft 53.

The screw 54 is adapted to be received within the housing 42. The shaft 53 may be adjusted in the collar 55 so that the bottom end of the screw does not contact the bottom 41 of the pot or vessel. The bottom of the housing 42 may be provided with one or more inlet openings 57.

The operation of this embodiment is as follows. The container 46 is provided with a filter 58 and a desired quantity of ground coffee (not shown). The top 49 is engaged with the cylindrical side wall 48 of the container and is engaged, by means of the collar and set screw assembly, with the shaft 53. A suitable pot or vessel, having a bottom shown at 41 and containing the housing 42, is filled with the desired quantity of water which may either be preheated or heated while in the pot or vessel. When the water is boiling, or has substantially reached the boiling point, the heating source is turned down, turned off or removed and the container and pump assembly is lowered into the vessel. The screw 54 is lowered into the housing 42 and the bottom 47 of the container 46 is brought to rest on the bearing 45. The upper end of the shaft 53 is affixed to suitable means for imparting rotation to it, and the shaft 53 (and consequently the screw 54 and the container 46) is caused to rotate. Rotation of the screw 54 will draw the hot water into the housing via the inlet opening 57. The water will be drawn upwardly into the container 46. The ground coffee contained therein will, by virtue of centrifugal force, be formed into a layer against the filter 58, and the same centrifugal force will cause the water in the container to pass through the ground coffee, the filter 58, and the foraminous cylindrical wall 48.

Again, with the use of the apparatus of FIG. 8, it has been found that the desired quantity of coffee may be produced in two minutes or less from two-thirds to one-half as much ground coffee as would be required in conventional methods. It will further be understood that the container and pump assembly may already be in the vessel when hot water is introduced therein, or when cold water is introduced therein and heated.

FIG. 9 illustrates a household type coffeepot which may be adapted to use any of the embodiments of the coffee making device illustrated in FIGS. 1–18. The coffeepot, generally indicated at 59, comprises a body or container portion 60 of glass, metal, or other suitable metal. The base 61 of the pot may contain a conventional heating element (not shown) connected to a source of electricity by means of a plug 62 and a current carrying cord 63. The pot 59 may also be provided with a handle 64 affixed at its bottom end to the base 61 and at its upper end to the neck 60a of the body. A closure means or top 65 is provided for the pot, and has a downwardly depending portion 66 adapted to be received in the neck 60a of the pot body. The top may also be provided with a handle 65a.

As is diagrammatically indicated in FIG. 9, the top 65 is hollow and contains motor means generaly indicated at 67. The motor 67 has a downwardly depending shaft 68 passing through a watertight seal 69 in the bottom of the closure member 65. The shaft 68 terminates in a quick release means adapted to receive either the shaft 7 (shown in FIGS. 1, 3 and 5), the shaft 25 (shown in FIG. 6) or the shaft 53 (shown in FIG. 8). The quick release means on the end of shaft 68 may be of any suitable type. For purposes of illustration, the quick release means is shown as comprising a socket means 69 having a resilient detent means 70 adapted to engage a notch or depression in a shaft such as shafts 7, 25 and 53. It will also be understood by one skilled in the art that the shaft 68 may terminate in a blunt end, adapted to be engaged by a quick release means located on the ends of the above described shafts 7, 25 or 53.

Suitable electrical connection may be made between the motor 67 and the plug 62 by electrical conduit means (not shown) passing through the base 61, the handle 64, and the top 65. In order that the top 65 be removable, suitable electrical contact means will be provided between the top 65 and the handle 64. For example, these contact means (not shown) may be provided between the upper end of the handle 64 and an overlapping portion 65b of the top 65. Switch means 71 may be provided in the handle 64 for turning the motor 67 off and on.

FIG. 13 is a simplified electrical diagram wherein leads 62a and 62b are adapted to make electrical contact with plug means 62. A heating element 61a may be located in base 61 (FIGS. 9 and 10). Switch 71 and motor 67 are also illustrated. Contacts 67a are the contacts mentioned above as being located between the handle 64 and the portion 65b of the top 65.

As described above, the pot of FIG. 9 may be used in conjunction with any of the above described embodiments of the coffee making device. For purposes of an exemplary showing, the pot of FIG. 9 is illustrated in FIG. 10 in combination with the coffee making means shown in FIGS. 1, 2 and 3. Like parts have been given like index numerals. It will be noted that the scoops 8 and 9 are located relatively near the bottom of the vessel or body portion 60 of the pot.

With any of the embodiments of the coffee making device it is preferable to provide spoiler means within the pot or vessel to prevent undue swirling of the liquid body therein. The spoiler means may be of any suitable type such as that shown at 40 in FIGS. 6 and 7. Exemplarily, one or more vanes may be located in the pot or vessel and may be affixed to or integral with the pot side or bottom. Such a spoiler is illustrated at 60a in FIGS. 9 and 10, and 81a in FIG. 12.

FIG. 11 illustrates another embodiment of a coffeepot which may be used in the practice of the present invention. The figure further illustrates another form of rotatable shaft means. In this embodiment a stand 72 is provided at its upper surface with a conventional hot plate 73. The stand has a hollow upwardly extending shaft or column 74. A second column 75 is slidably received in the column 74 and terminates at its upper end in a housing 76 for a motor means (not shown). The motor means has a downwardly depending shaft 77 extending through the housing 76. A source of electrical current for the hot plate 73 and the motor means within the housing 76 may be provided by a plug 78 connected to an electrical cord or conduit 79 leading from a source of current. Suitable controls (not shown) for the motor means and the hot plate 73 may be located on the housing 72 or the housing 76. A coffeepot is generally indicated at 80 and comprises a body portion 81, a handle 82, and a top or closure means 83.

The motor shaft 77 extends through the top 83 and is provided with suitable bearing means 84 and 85. The bearing 85 is preferably watertight. The shaft 77 is adapted to engage the upper end of any of the shafts 7, 25 or 53 of the above described embodiments of the coffee making device. Again, a quick release engagement means may be provided on the shaft of the coffee making device or on the end of the shaft 77. For purposes of an exemplary showing, the end of the shaft 77 is illustrated as having a sleeve 86 with a resilient detent means 87.

As indicated above, the apparatus of FIG. 11 may be used in conjunction with any of the above described embodiments of the coffee making device. For purposes of an exemplary showing, FIG. 12 illustrates the apparatus of FIG. 11 in combination with the coffee making device of FIGS. 1, 2 and 3. Again, like parts have been given like index numerals. It will be understood by one skilled in the art that when the shaft 6 has been connected to the shaft 77, the container 1 may be raised or lowered into the pot by raising or lowering the housing 76. The housing 76 may be raised or lowered by virtue of the telescoping of the column 75 in the column 74.

When the device of FIGS. 1, 2 and 3 is used as shown in FIG. 12, it may be desirable to provide an additional shaft 86 extending downwardly from the bottom 2 of the container. The shaft 86 will be removably engaged in a bearing 87 located at the bottom of the vessel or coffeepot 80. Such an arrangement will prevent any wobbling of the container 1, and insure smooth rotation thereof.

FIG. 14 shows another embodiment of the present invention. In this embodiment, a vessel 88 is provided having a pump housing 89 located in the bottom thereof. The pump housing 89 has an opening 90 in the side thereof communicating with a tube or conduit 91 extending upwardly in the vessel. The tube 91 is provided at its upper end with a downwardly directed opening 92.

The pump housing 89 is provided at its bottom with a bearing 93 adapted to receive the end of a shaft 94. The shaft 94 carries a plurality of impeller blades 95 which cooperate with the pump housing 89 in such a way as to force extracting fluid from the vessel 88 upwardly through the conduit or tube 91 in the direction of the arrow.

A container for vegetable matter such as coffee or the like is affixed to the shaft 94. The container is substantially the same as that shown in the previous embodiments above. The container comprises a bottom 96, a removable top 97 and a cylindrical foraminous side wall 98. Again, the side wall 98 may be made of screen, wire mesh, expanded metal or the like. The container is affixed to the shaft by suitable means such as the welding of the container bottom 96 to the shaft at 99. As illustrated, the container cap or top 97 slants inwardly and downwardly from its periphery toward the shaft 94 and is provided with a perforation 100 through which the shaft 94 passes. The perforation 100 forms an annular opening about the shaft 94.

The operation of this embodiment is similar to the embodiments described above. The container may be provided with a filter 101. Vegetable matter such as coffee or the like may then be placed in the container and the cap 97 positioned on the container as shown. The container-shaft assembly is then located in the vessel 88, with the shaft end positioned in the bearing 93. It will be understood by one skilled in the art that the upper end of the shaft 94 (not shown) will be provided with connecting means to the shaft of a motor. This motor may be located in a separate unit or in a cap means for the vessel 88, all as described above. When extracting fluid if the vessel 88 has attained the proper temperature, the container-shaft assembly will be caused to rotate. Extracting fluid from the vessel will be forced by the impeller blades through the conduit or tube 91. The opening 92 in the tube will direct the fluid downwardly through the opening 100 in the container cap 97. Extracting fluid entering the container through the cap opening 100 will then be caused, by centrifugal force, to pass through the vegetable matter or coffee, the filter 101 and the foraminous side wall 98 back into the vessel 88.

Thus far, all of the embodiments of the present invention have been described as being driven by motor means located in the vessel cap or in a separate unit with a shaft passing through the vessel cap. It will be understood by one skilled in the art, however, that it is within the scope of the present invention to cause rotation of the vegetable matter container by shaft means passing through the bottom of the vessel and connecting with motor means located below the vessel. Such motor means may be mounted in a bottom portion of the vessel itself, or in a separate unit constituting a stand for the vessel.

Figure 15:
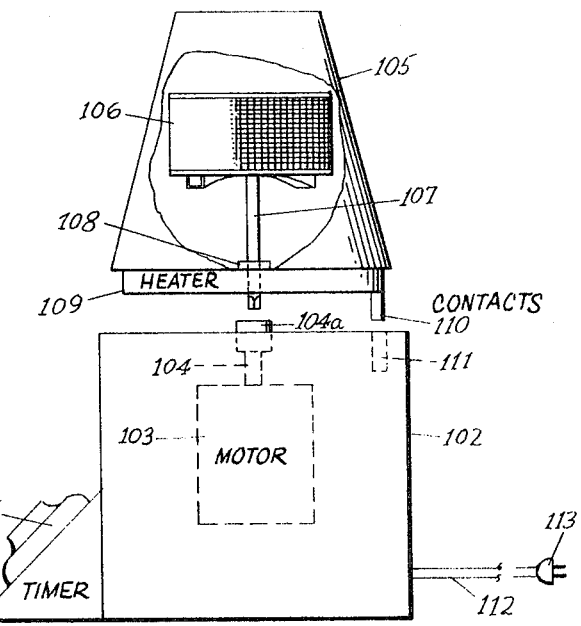
FIG. 15 is a fragmentary elevational cross sectional view of a vessel and stand therefor, the stand containing motor means for driving the container through a sealed bearing in the vessel bottom.

For purposes of an exemplary showing, FIG. 15 illustrates an embodiment of the invention wherein the vegetable matter container is caused to rotate by motor means located beneath the vessel in a stand for the vessel. In this instance, a stand 102 is shown containing motor means 103 having an upwardly extending shaft 104.

A vessel 105 having suitable handle and cap means (not shown) is illustrated as having a vegetable matter container 106 similar to that described with respect to FIGS. 1, 2 and 3. The container 106 has a downwardly extending shaft 107 which passes through sealed bearing means 108 in the container bottom. The sealed bearing means 108 may be of any well known type. It will also be understood by one skilled in the art that while a container 106 of the type described with respect to FIG. 1 is shown, any of the embodiments of the present invention may be utilized in the manner shown in FIG. 15, by the provision of suitable shaft means to extend through the sealed bearing in the vessel bottom.

The quick release connection between the container shaft 107 and the motor shaft 104 may also be of any suitable type. For example, the lowermost end of the container shaft 107 may have a non-circular cross section. The uppermost end of the motor shaft 104 may have socket means 104a having a central perforation of matching noncircular cross section. Placement of the end of the shaft 107 in the socket 104a will permit the motor 103 to rotate the container 106, and yet will permit the easy removal of the vessel 105 from the base 102.

The vessel 105 may be provided with hot water from an external source, or it may be provided with cold water which is heated by means of a heating element located in the base 102. For purposes of an exemplary showing, however, the vessel 105 is illustrated as having a heating element 109 permanently affixed thereto. The heating element 109 may have contact means 110 adapted to be received in socket means 111 in the base 102. Thus, when the vessel 105 is placed on the base 102, the heater means 109 may be energized by virtue of the contacts 110 located within the socket 111. The base 102 has an electric cord 112 terminating in a plug 113 which may be connected to a suitable source of electric current such as ordinary house current or the like. Electrical energy thus derived may be used both to energize the motor 103 and the heating element 109. Finally, the base may also be provided with timer means generally indicated at 114 having a control knob 115.

The embodiment of FIG. 15 may be used as follows. The container 106 is filled with coffee or other suitable vegetable matter, and the vessel 105 is filled with a desired amount of water or other extracting liquid. The container 105 is then passed on the base 102 whereby the contacts 110 of the heating element 109 are located in the base socket 111 and the container shaft 107 is connected to the motor shaft 104. The timer 114 may be set for a suitable period of time such as two minutes. Thermostatic means (not shown) may also be provided whereby, when the liquid in the vessel 105 has attained the proper temperature, the heater element 109 will be regulated to maintain the proper temperature and the motor 103 will be energized for the period of time set on the timer 114.

An on-off switch may also be provided in the base 102 whereby the plug 103 may remain connected to a source of current at all times. The on-off switch (not shown) may be manipulated by hand, or may be switched to the on position by placement of the vessel 105 on the stand 102, removal of the vessel from the stand causing the switch to return to its off position.

Figure 16:
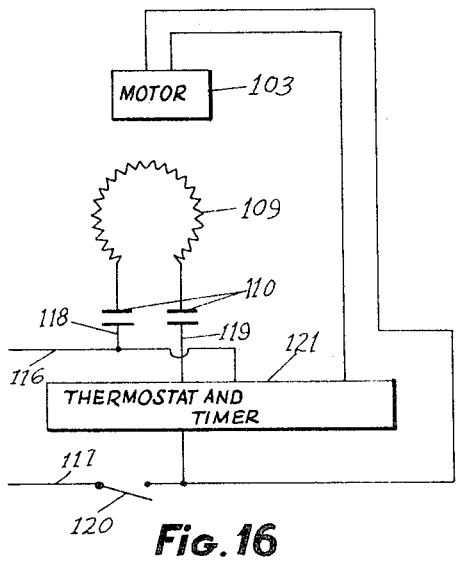
FIG. 16 is a simplified diagrammatic representation of typical electrical circuitry for the device of the present invention including thermostatic and timer control means.

FIG. 16 is an exemplary circuit diagram for the embodiment of FIG. 15. Like parts have been given like index numerals. In this instance, leads 116 and 117 comprise the electric cord illustrated at 112 in FIG. 15. The heating element 109 is shown connected across the leads 116 and 117 by leads 118 and 119 containing the contacts 110. An on-off switch, as described above, is shown at 120. The thermostat and timer controls are diagrammatically illustrated at 121.

Modifications may be made in the invention without departing from the spirit of it. For example, it is within the scope of the invention to provide a coffeepot having a top containing a motor similar to the top 65 in FIG. 9. The motor, however, may be connected to a source of electricity contained within the top such as batteries or the like, or the top itself may be provided with an electrical cord or conduit adapted to be connected to a source of current.

It will be understood that the electrical circuitry for the structure shown in FIGS. 11 and 12 will be much the same as that shown in FIG. 13. It is within the scope of the invention to have separate switch means for the heating means 61a. Similarly, temperature control means of well known type may be provided in association with heating means 61a and speed control means may be provided in association with motor 67. Finally, in all of the embodiments above, the container-shaft assembly may simply be provided with crank means or the like so that they may be caused to rotate by hand.

The embodiments of the invention in which an exclusive property or privilege is claimed are defined as follows:

1. An apparatus for extracting flavoring elements from vegetable matter comprising a vessel for containing extracting liquid, a container for vegetable matter, said container having an access opening through which the vegetable matter may be introduced, a portion of said container being foraminous, means for supporting said container within said vessel, means for introducing the liquid in said vessel into said container, means for imparting rotation to said container whereby the liquid therein is caused to pass through the vegetable matter therein and through said foraminous portion into said vessel by centrifugal force, said foraminous portion of said container being so located that said liquid which has passed through said vegetable matter is returned to said vessel and mixed with said liquid therein whereby repeated extraction is performed by the same recirculated liquid during rotation of said container, said rotation imparting means comprising an electric motor connected to said container by shaft means, electrical means for heating said liquid in said container to a predetermined temperature, thermostatic means for regulating said heating means and energizing said motor when said liquid has attained said predetermined temperature, and timer means for controlling the length of time for which said motor will run.

2. An apparatus for extracting flavoring elements from vegetable matter comprising a vessel for containing extracting liquid, a container for vegetable matter, said container having an access opening through which the vegetable matter may be introduced, said container comprising a bottom, a foraminous side wall affixed to said bottom, said side wall having an upper edge defining said access opening, means for supporting said container within said vessel, means for introducing the liquid in said vessel into said container, means for imparting rotation to said container whereby the liquid therein is caused to pass through the vegetable matter therein and through said foraminous side wall into said vessel by centrifugal force, said foraminous side wall of said container being so located that said liquid which has passed through said vegetable matter is returned to said vessel and mixed with said liquid therein whereby repeated extraction is performed by the same recirculated liquid during rotation of said container, said means for introducing said liquid from said vessel into said container comprising pump means, said pump means comprising a vertically oriented cylindrical housing supported on the bottom of said vessel, said housing having an inlet opening near said bottom of said vessel, said housing having an upper end extending through a perforation in said bottom of said container and rotatively supporting said container, cap means for said container, a shaft having upper and lower portions, the upper portion of said shaft extending through a perforation in said container cap and being removably affixed to said container cap, the lower portion of said shaft extending into said housing and comprising a pump screw, means at the end of said upper portion of said shaft for affixing said shaft to said rotation imparting means whereby said shaft and said container can be rotated with respect to said housing.

3. An apparatus for extracting flavoring elements from vegetable matter comprising a vessel for containing extracting liquid, a container for vegetable matter, said container having an access opening through which the vegetable matter may be introduced, a portion of said container being foraminous, removable cap means for said container, means for supporting said container within said vessel, means for introducing the liquid in said vessel into said container, means for imparting rotation to said container whereby the liquid therein is caused to pass through the vegetable matter therein and through said foraminous portion into said vessel by centrifugal force, said foraminous portion of said container being so located that said liquid which has passed through said vegetable matter is returned to said vessel and mixed with said liquid therein whereby repeated extraction is performed by the same recirculated liquid during rotation of said container, said means for introducing said liquid in said vessel into said container comprising a pump means, said pump means comprising a pump housing supported on the bottom of said vessel and a plurality of impeller blades supported on a hollow shaft, said hollow shaft extending through perforations in said bottom and said cap of said container, said shaft non-rotatively affixed to said container bottom and having a plurality of outlet openings within said container, means for engaging said shaft with said rotation imparting means, said pump housing communicating with the interior of said hollow shaft and having inlet openings near said bottom of said vessel.

4. An apparatus for extracting flavoring elements from vegetable matter comprising a vessel for containing extracting liquid, a container for vegetable matter, said container having an access opening through which the vegetable matter may be introduced, said container comprising a bottom, a foraminous side wall affixed to said bottom, said side wall having an upper edge defining said access opening, means for supporting said container within said vessel, means for introducing the liquid in said vessel into said container, means for imparting rotation to said container whereby the liquid therein is caused to pass through the vegetable matter therein and through said foraminous side wall into said vessel by centrifugal force, said foraminous side wall of said container being so located that said liquid which has passed through said vegetable matter is returned to said vessel and mixed with said liquid therein whereby repeated extraction is performed by the same recirculated liquid during rotation of said container, said means for introducing said liquid in said vessel into said container comprising a pump means, said pump means comprising a pump housing supported on the bottom of the vessel and a plurality of impeller blades supported on a shaft, said shaft non-rotatively affixed to said container, said pump housing having an inlet opening near the bottom of said vessel, means connected to said pump housing for conveying said liquid therefrom to said opening in said container, and means for engaging said shaft with said rotation imparting means.

5. An apparatus for extracting flavoring elements from vegetable matter comprising a vessel for containing extracting liquid, a removable closure means for said vessel, a container for vegetable matter, said container having an access opening through which the vegetable matter may be introduced, a portion of said container being foraminous, means for supporting said container within said vessel, means for introducing the liquid in said vessel into said container, means for imparting rotation to said container whereby the liquid therein is caused to pass through the vegetable matter therein and through said foraminous portion into said vessel by centrifugal force, said foraminous portion of said container being so located that said liquid which has passed through said vegetable matter is returned to said vessel and mixed with said liquid therein whereby repeated extraction is performed by the same recirculated liquid during rotation of said container, said means for imparting rotation to said container comprising a motor and a first rotatable shaft connected to said motor, said first rotatable shaft extending through a part at least of said vessel closure means and extending into said vessel, a second shaft in association with said container, a releasable connection between said first and second shafts, a stand, said vessel adapted to rest on said stand, a heating means within said stand for imparting heat to said extracting liquid, said stand having an additional portion extending above said closure means for said vessel, said motor means located within said additional portion of said stand, control means in association with said stand for said heating means and said motor means.

References Cited

UNITED STATES PATENTS

| | | | |
|---|---|---|---|
| 719,541 | 2/1903 | Wheelwright | 210—416X |
| 1,602,632 | 10/1926 | Zorn. | |
| 1,850,821 | 3/1932 | Wright | 210—416X |
| 2,368,530 | 1/1945 | Edwards | 103—113 |
| 2,671,405 | 3/1954 | Stoors | 103—99 |
| 2,767,846 | 10/1956 | Schulse | 23—272X |
| 3,172,850 | 3/1965 | Engelsberg | 210—172 |
| 3,282,703 | 11/1966 | Broadhurst | 99—71 |
| 427,410 | 5/1890 | Forbes | 23—272.6X |
| 1,471,752 | 10/1923 | Rieckmann | 210—196X |
| 3,320,073 | 5/1967 | Bixby | 99—71 |

FOREIGN PATENTS

| | | |
|---|---|---|
| 946,091 | 12/1948 | France. |
| 601,829 | 2/1960 | Italy. |
| 94,716 | 7/1960 | Netherlands. |
| 427,252 | 7/1922 | Germany. |

FRANK W. LUTTER, Primary Examiner

R. HALPER, Assistant Examiner

U.S. Cl. X.R.

99—71.75; 210—416